3,748,281
PROCESS FOR THE PREPARATION OF HEXACHLOROCYCLOPENTADIENE

Kenneth K. Aoki, Trenton, and Arnold L. McMaster, Lincoln Park, Mich., assignors to BASF Wyandotte Corporation, Wyandotte, Mich.
No Drawing. Original application Mar. 17, 1969, Ser. No. 807,913, now Patent No. 3,649,699. Divided and this application Aug. 25, 1971, Ser. No. 174,969
Int. Cl. B01j *11/78*
U.S. Cl. 252—441                    2 Claims

ABSTRACT OF THE DISCLOSURE

A process for producing hexachlorocyclopentadiene (HCCP) in a single stage thermal chlorination reaction wherein n-pentane and chlorine are reacted at 275–400° C. in the presence of a catalyst comprising porous alumina having a low surface area of from about 0.4 m.$^2$/g. to about 30 m.$^2$/g. and can contain specified metal chlorides. This process is also suitable for producing HCCP from chlorine and other $C_5$ hydrocarbons.

---

This application is a division of patent application Ser. No. 807,913 filed Mar. 17, 1969, now U.S. Pat. 3,649,699 granted Mar. 14, 1972.

The present invention relates to methods of preparing hexachlorocyclopentadiene (HCCP). More particularly, the present invention relates to a single stage thermal chlorination reaction method for producing HCCP directly from (1) n-pentane and other $C_5$ hydrocarbons and (2) chlorine. Even more particularly, the invention concerns an improved catalyst for producing HCCP directly from (1) n-pentane and other $C_5$ hydrocarbons and (2) chlorine in a single stage thermal chlorination reaction.

It is known that HCCP can be prepared by reacting n-pentane, its isomers, or its chlorinated derivatives, such as, polychloropentanes and octachlorocyclopentene, with chlorine in a single stage thermal chloration process and in the presence of a catalyst. These reactions generally comprise catalytically reacting pentanes and their derivatives or mixtures thereof with stoichiometrically excess quantities of chlorine at elevated temperatures ranging from 200–600° C. and usually at a temperature ranging from about 400–550° C. The catalysts employed in these reactions vary widely. For example, solid catalysts such as barium sulfate, infusorial earth, kieselguhr briquettes, pumice, sodium chloride, and activated carbon have been used. Vaporous catalysts, such as, amides nitriles, amines and the like have also been utilized according to the prior art. The art even teaches the preparation of HCCP from pentane and chlorine at elevated temperatures and in the presence of light. However, these reactions give low yields of HCCP, generally in the range of 50 to 75% of theoretical amounts. In addition, many of these so-called "single-stage processes" are actually multi-stage processes in that the reaction is carried in the presence of a thermal gradient created and generated throughout the reaction zone.

Recently, however, it has been discovered by Minsinger, U.S. Pat. No. 3,364,269 and German Pat. No. 1,123,317, that HCCP can be prepared by a catalytic single-stage process without the necessity of a thermal gradient in the reaction cell or chamber. Minsinger proposes using a fluidized bed of a catalytically activated carbon as a repalcement for the thermal gradient. In one example of this improvement, stoichiometric proportions of vaporous chlorine and pentane are premixed prior to entry into the reaction vessel. The vaporous chlorine-pentane mixture is then reacted over the fluidized bed of catalytic, activated carbon at a temperature of about 500° C. By this procedure, near theoretical yields of hexachlorocyclopentadiene, based on stoichiometric proportions of the reactants, are achieved.

The Minsinger process provides a marked improvement over the prior art. However, there are inherent dangers associated with premixing the pentane and chlorine since the mixture is potentially quite explosive. Necessarily, this negates and inhibits the practicing of Minsinger, especially where large scale reactors are employed. However, unless the reactants are premixed, the yields of HCCP are well below what would otherwise occur.

Accordingly, it is an object of the present invention to provide an improved method of producing HCCP directly from n-pentane and chlorine. Another object of the present invention is to provide a method for producing HCCP from other saturated or unsaturated, aliphatic or cycloaliphatic hydrocarbons having five carbon atoms. It is another object of the present invention to provide a novel catalyst useful in the preparation of HCCP. A still further object of the present invention is the elimination of significant excess chlorine requirements in the manufacture of HCCP. It will be readily apparent to those skilled in the art that these and other objects are achieved by the present invention upon reference to the following detailed description.

Minsinger has stated (German Pat. 1,123,317) that in selecting the catalyst for the reaction "alumina and bauxite do not come into consideration because these channel the reaction into the direction of secondary reactions and give only poor yields of HCCP."

Unexpected, and in contradistinction to Minsinger, it has now been discovered that alumina can be used as a catalyst in a single-stage process for preparing HCCP from (1) n-pentane and other $C_5$ hydrocarbons and (2) chlorine. Initially, this discovery has eliminated the necessity of premixing the chlorine and n-pentane or other $C_5$ hydrocarbons, and therefore, the potentially explosive environment is obviated. Furthermore, the reaction temperatures are reduced significantly. Important, also, is that by using near stoichiometric proportions of the reactants, upwards of more than 95% HCCP is obtained from the reaction.

In accordance with the present invention, separate streams of n-pentane or other $C_5$ hydrocarbon and chlorine are directly admitted into a single-stage reactor. The resulting mixture is reacted at about 275–400° C., preferably from 325–375° C., in the presence of a fluidized bed of a catalyst comprising porous, low surface area alumina which may optionally have incorporated therewith minute quantities of a metallic salt. The reaction product, vaporous HCCP, is withdrawn from the reactor and condensed to produce a final product of liquid HCCP.

The term "other $C_5$ hydrocarbons," as used herein, includes those saturated or unsaturated aliphatic and cycloaliphatic hydrocarbons having five carbon atoms. Representative of these are isopentane, neopentane, cyclopentane, cyclopentene, cyclopentadiene, isoprene, 1,3-pentadiene, 2-methyl-butene-1, and pentene-1 and the like. For purposes of illustration, however, the description will be made with reference to the preparation of HCCP from n-pentane. It is to be understood, however, that the isomers of n-pentane and the other denoted $C_5$ hydrocarbons are within the scope of the present invention.

It is critical that the alumina have a low surface area in order that the reaction be carried out to any degree of efficiency. The surface area of the alumina can range from about 0.4 square meter per gram (m.$^2$/g.) to about 30 m.$^2$/g., preferably about 0.4 m.$^2$/g. to 10 m.$^2$/g. Higher surface areas of alumina, although providing adequate yields of about 60 to 70% of HCCP, have a very short catalytic life ranging from two to fourteen hours.

The amount of catalyst, by weight, used in the present invention is a function of the reactor dimensions, desired height of the catalytic bed and the amount and rate of gas flow. However, to accommodate all these variables, it is advantageous to use an alumina catalyst having an apparent bulk density of from 45 lbs./ft.$^3$ to about 80 lbs./ft.$^3$, preferably about 50 lbs./ft.$^3$ to 70 lbs./ft.$^3$ and having a particle size ranging from about 10 to 90 microns, with an average particle size of about 40 to 80 microns.

The reactants, pentane and chlorine, are introduced into the reaction vessel in slightly excess stoichiometric proportions, i.e., from about nine to ten moles of chlorine to one mole of n-pentane, preferably from 9.0 to 9.4 moles of chlorine per mole of n-pentane. Under these feed conditions and in the presence of low surface area alumina, n-pentane and chlorine can be reacted at from 275–400° C. to produce HCCP in the present single-stage thermal chlorination process with upwards of 86% yield of HCCP.

In carrying out the process of the present invention, the flow rates of the gaseous reactants can be varied within wide limits and can be readily determined by one skilled in the art. In general, the flow rates are dependent upon the desired molar ratio of the reactants and the amounts of gases necessary to maintain fluidization of the catalytic bed. It has been found that any flow rates which ensure both fluidization of the catalytic bed and proper molar ratios are suitable for practicing the present process. The residence or contact time can vary within rather wide limits, for example, from 20 to 100 seconds, preferably from about 20 to 70 seconds. Residence time is, of course, dependent upon the height of the catalytic bed as well as the flow rates.

It has been found that by adding small quantities of a metal salt to the alumina catalyst, the reaction is further promoted with increases in the yield of HCCP. The metal salts that can be employed include barium chloride, potassium chloride, cadmium chloride, cupric chloride, and mixtures thereof. It is usually preferred to employ cupric chloride. About 0.25 to 21%, preferably from about 0.40 to 6.0%, of the total weight of the catalyst can be comprised of the metal salt. Stated another way, by providing an alumina catalyst having a porous surface area of up to 30 m.$^2$/g. and to which has been added up to 6% by weight of a metallic salt, the reaction is further promoted to where a yield of upwards to 95% HCCP can be obtained.

The alumina-salt catalyst can be prepared by any conventional method known in the art. In one method, the solid alumina is immersed in an aqueous bath having the metallic salt dissolved therein. This is followed by evaporation of the water to give an alumina catalyst having the metallic salt deposited thereon.

It has also been found that by introducing a quantity of oxygen into the reaction vessel, the useful life of the catalyst is increased. The reason for this phenomenon is not entirely understood. However, it is believed that the oxygen prevents the formation of polymeric non-volatile by-products. The non-volatile by-products that would otherwise be formed appear to be condensation products of HCCP or its precursors which collect and build-up on the low surface area catalytic surface. Under the thermal influence generated in the reactor, these non-volatiles, in the absence of oxygen, tend to block the surface pores and thereby degenerate the catalyst. The oxygen prevents the polymer formation and the resulting catalyst degeneration, thereby lengthening the useful life of the catalyst. However, control of the amount of oxygen introduced into the reactor is necessary, for otherwise secondary reactions occur in the reactor. By limiting the amount of oxygen introduced into the system from 0.01 mole to a maximum of 0.70 mole of oxygen per mole of pentane feed, preferably from about 0.10 to 0.70 mole of oxygen per mole of pentane feed, the yields of HCCP are not affected while the useful life of the catalyst is preserved or lengthened. Preferably, the oxygen is introduced as air which is premixed with the chlorine prior to entry into the reaction vessel.

It is also advantageous to add a suitable diluent, such as nitrogen or HCl, to the feed streams. It is usually preferred to utilize nitrogen as the diluent. This can be readily accomplished by mixing the diluent with the n-pentane and chlorine or oxygenated chlorine streams previous to injection into the reactor. Although the nitrogen is not essential to the process, its presence ensures maintainance of the fluidization of the catalytic bed.

The following examples illustrate various experiments conducted in accordance with the present invention. These examples, while illustrating specific embodiments of the invention, are not intended to be construed as unduly limitative of the present invention.

Unless otherwise indicated, the percentage yields express the yield of HCCP based upon the recovery of chlorinated hydrocarbon which is determined by dividing the number of moles of HCCP isolated by [the number of moles of C$_5$ hydrocarbon feed minus the sum of the number of moles polychloropentanes and octachlorocyclopentenes isolated], i.e., $$\text{Percent yield} = \frac{\text{moles HCCP isolated}}{\text{feed moles of C}_5\text{ hydrocarbon} - \Sigma(x+y)}$$

wherein $x$ is the number of moles of polychloropentanes isolated and $y$ is the number of moles of octachlorocyclopentene isolated.

EXAMPLE I

The apparatus employed comprised a 2" x 36" glass pipe reactor, wrapped with Nichrome wire heaters and fitted with a stainless steel bottom plate and a 2" glass pipe elbow top enclosure. The elbow was connected at its other end to a condensing system which comprised a cold water condenser, a wet ice condenser and a Dry Ice condenser. A 5½" column of Ottawa sand, used to disperse the reactant gases and support the catalytic bed, was charged into the reactor.

The bottom plate supported a thermowell, which was fitted with a thermocouple for temperature control, extended 12" into the reactor. An aperture in the bottom plate defined a chlorine inlet while a ¾" stainless steel tube, also charged with Ottawa sand, supported by the bottom plate and extending 6" into the reactor, defined the pentane inlet. By providing the staggered heights of the inlets, such that the pentane was admitted into the reactor at the catalytic zone and the chlorine at the sand zone, it was assured that the reactants did not premix prior to coming into contact in the catalytic zone of the reactor.

To this apparatus was charged an alumina catalyst having a surface area of 6 m.$^2$/g., which was fluidized with nitrogen. The reactor was then heated up to 350° C. Feeds of nitrogen diluted chlorine and pentane were separately fed into the reactor in a molar ratio of 9.0 to 1.0. About 0.68 mole of oxygen per mole of pentane feed was also premixed with the chlorine. After a two hour period the condensates obtained from each condenser were drawn off and analyzed with an Aerograph Model A–350–B dual column temperature programmed gas chromatograph.

The yield of HCCP was 93%.

EXAMPLE II

Using the apparatus of Example I, a series of runs was conducted wherein the reactor was charged with alumina catalysts having varying surface areas. Feeds of n-pentane and chlorine were then reacted over these supports. There was an oxygen feed premixed with the chlorine which comprised 0.68 mole of oxygen per mole of n-pentane feed. Each of the feed streams was diluted with a sufficient nitrogen feed to ensure maintenance of a fluidized catalytic bed and residence time within the reactor was between 30 to 60 seconds.

After a period of time, the condensates of each run were analyzed as in Example I. The results are set forth below in Table 1.

TABLE 1

| Run | Temp., °C. | Feed molar ratio, $A_2/C_5H_{12}$ | Percent yield | Surface area of catalyst, m.²/g. |
|---|---|---|---|---|
| 1 | 280 | 9.0/1 | 63 | 6 |
| 2 | 300 | 9.0/1 | 88 | 6 |
| 3 | 325 | 9.0/1 to 1 | 90 | 6 |
| 4 | 350 | 9.2/1 to 1 | 96 | 6 |
| 5 | 375 | do | 92 | 6 |
| 6 | 400 | do | 86 | 6 |
| 7 | 375 | 9.4/1 to 1 | 97 | 6 |
| 8 | 400 | do | 88 | 6 |
| 9 | 350 | 10/1 | 51 | 180-200 |
| 10 | 350 | 10/1 | 55 | 30 |
| 11 | 350 | 10/1 | 97 | 7 |
| 12 | 300 | 10/1 | 76 | 5 |
| 13 | 325 | 10/1 | 84 | 5 |
| 14 | 350 | 10/1 | 96 | 5 |
| 15 | 370 | 10/1 | 92 | 5 |
| 16 | 350 | 10/1 | 86 | 0.4 |

It can be seen from the above, that the yields of HCCP appreciably decrease when high surface area alumina, i.e., above 30 m.²/g. is used as the catalyst. Additionally, as hereinbefore stated, high surface area alumina has a very short catalytic life.

EXAMPLE III

Using the apparatus of Example I, a series of runs was conducted using catalysts comprising various metal salts deposited on low surface area alumina. In all the runs, alumina having a surface area of 6 m.²/g. was utilized and the reactants were n-pentane and chlorine. The results are tabulated below in Table 2.

TABLE 2

| Run | Alumina and salt catalyst composition¹ | Temp., °C. | Percent yield | Feed molar ratio, $Cl_2/C_5H_{12}$ |
|---|---|---|---|---|
| 1 | 1% $CuCl_2$ | 350 | 95 | 9/1 |
| 2 | 1% $CuCl_2$ | 350 | 95 | 9/1 |
| 3 | 1% $CuCl_2$ | 350 | 98 | 9/1 |
| 4 | 3% $CuCl_2$ | 330 | 91.4 | 9/1 |
| 5 | 3% $CuCl_2$ | 350 | 95.3 | 9/1 |
| 6 | 3% $CuCl_2$ | 350 | 95 | 9/1 |
| 7 | 3% $CuCl_2$ | 370 | 91.9 | 9/1 |
| 8 | 3% equimolar K, Cu chlorides | 350 | 94.5 | 9/1 |
| 9 | 1.5% equimolar K, Cu chlorides | 350 | 83 | 9/1 |
| 10 | 3% equimolar K, Cu, Ni chlorides | 350 | 89 | 9/1 |
| 11 | 0.5% $CuCl_2$, 0.5% $BaCl_2$ | 350 | 95 | 9/1 |
| 12 | 3% $CdCl_2$ | 350 | 82 | 9/1 |
| 13 | 6% $CuCl_2$ | 350 | 94 | 9/1 |
| 14 | 0.25% $CuCl_2$ | 350 | 92 | 9.4/1 |

¹ Percent of total weight of catalyst.

It can be seen from Table 2 that the metallic salts, especially copper chloride, promote the reaction to where better yields of HCCP are obtained than with solely an alumina catalyst.

EXAMPLE IV

As herein before noted the present method is also useful for producing HCCP from $C_5$ hydrocarbons other than n-pentane. Following the procedure of Example I, alternative $C_5$ hydrocarbons were substituted for n-pentane and the molar ratio was adjusted accordingly. In all the examples, an alumina catalyst having 1% by weight of copper chloride added thereto was employed and the reaction was carried out for two hours. The alumina had a surface area of 6 m.²/g. The following table, Table 3, sets forth the yields of HCCP obtained from these hydrocarbons at varying temperatures.

TABLE 3

| Run | $C_5$ hydrocarbon reactant | $Cl_2/C_5/O_2$ molar ratio | Reaction Temp. °C. | Percent yield |
|---|---|---|---|---|
| 1 | Cyclopentane | 8.7/1/0.36 | 350 | 100 |
| 2 | Isopentane | 9.4/1/0.35 | 350 | 78 |
| 3 | do | 9.4/1/0.35 | 375 | 89 |
| 4 | Isoprene | 7.4/1/0.37 | 350 | 67 |
| 5 | do | 7.4/1/0.37 | 375 | 73 |
| 6 | neo-Pentane | 9.4/1/0.35 | 350 | 80 |
| 7 | do | 9.4/1/0.35 | 375 | 88 |
| 8 | do | 9.4/1/0.35 | 400 | 88.5 |
| 9 | 1,3-pentadiene | 7.4/1/0.36 | 350 | 90 |
| 10 | do | 7.4/1/0.36 | 375 | 65 |
| 11 | 2-methyl butene-1 | 8.4/1/0.36 | 350 | 80 |
| 12 | do | 8.4/1/0.36 | 350 | 84 |
| 13 | Pentene-1 | 8.4/1/0.36 | 350 | 87 |
| 14 | do | 8.4/1/0.36 | 375 | 85 |

It is seen from Table 3 that the present invention provides a method for producing HCCP in good yields with $C_5$ hydrocarbons other than n-pentane, its isomers or its polychlorinated derivatives such as the polychloropentanes and octachloropentene.

EXAMPLE V

Following the procedure of Example 1, 700 grams of a 99% $Al_2O_3$-1% $CuCl_2$, by weight, catalyst was charged into the reactor. Nitrogen diluted streams of n-pentane and oxygenated chlorine were fed into the reactor in a ratio of 9.1. A composite analysis of the products formed during the run were taken using the chromatograph of Example I. The yield of HCCP was 94.9%.

What is claimed is:

1. A catalyst composition for the chlorination of a hydrocarbon having five carbon atoms to obtain hexachlorocyclopentadiene consisting essentially of:
   (a) from 99.75 to 94 percent by weight of catalytically active porous alumina having a surface area from about 0.4 m.²/g. to 30 m.²/g.; and
   (b) from about 0.25 to 6 percent by weight of a metallic salt selected from the group consisting of barium chloride, potassium chloride, cadmium chloride, cupric chloride, and mixtures thereof and a mixture of potassium, copper and nickel chlorides.

2. The catalyst of claim 1 wherein said metallic salt comprises cupric chloride.

References Cited

UNITED STATES PATENTS

| 2,752,402 | 6/1956 | Pye | 260—659 A |
| 3,267,161 | 8/1966 | Ukaji et al. | 252—441 X |
| 3,427,359 | 2/1969 | Rectenwald et al. | 252—441 X |
| 3,522,325 | 7/1970 | Aristoff et al. | 252—441 X |
| 2,042,050 | 5/1936 | Hoover | 252—441 |
| 2,838,577 | 6/1958 | Cook et al. | 260—659 A |
| 3,240,805 | 3/1966 | Naglieri | 252—441 X |
| 3,299,152 | 1/1967 | Inaba et al. | 252—441 X |
| 3,461,084 | 8/1969 | Li | 252—441 |

PATRICK P. GARVIN, Primary Examiner

U.S. Cl. X.R.

260—648 C